United States Patent
Kawasaki et al.

[11] 4,021,099
[45] May 3, 1977

[54] OPTICAL COUPLERS FOR FIBER OPTIC COMMUNICATION LINKS

[75] Inventors: Brian S. Kawasaki, Carleton Place; Derwyn C. Johnson, Ottawa, both of Canada

[73] Assignee: Canadian Patents and Development Limited, Ottawa, Canada

[22] Filed: Jan. 12, 1976

[21] Appl. No.: 648,585

[52] U.S. Cl. .................. 350/96 C; 350/96 WG
[51] Int. Cl.² ........................... G02B 5/14
[58] Field of Search ........ 350/96 C, 96 WG, 96 R

[56] References Cited

UNITED STATES PATENTS

| | | | |
|---|---|---|---|
| 3,870,396 | 3/1975 | Racki et al. | 350/96 C |
| 3,883,223 | 5/1975 | Hudson | 350/96 C |
| 3,937,560 | 2/1976 | Milton | 350/96 C |

OTHER PUBLICATIONS

Cooper, "Coupler for Optical Data," IBM Tech. Discl. Bulletin, vol. 16, No. 5, Oct. 1973, pp. 1470-1471.

*Primary Examiner*—Edward S. Bauer
*Assistant Examiner*—Stewart Levy
*Attorney, Agent, or Firm*—Edward Rymek

[57] ABSTRACT

An optical coupler for a multi-mode optical fiber transmission line consisting of a first length of optical fiber and a second length of optical fiber positioned along a common axis such that one end of the second fiber is spaced a predetermined distance $l$ from one end of the first fiber. This allows a portion of the optical energy leaving the end of first fiber to enter the second fiber. The coupler further includes a reflective surface facing the first fiber to reflect the remaining portion of the optical energy out of the coupler. The percentage of the energy reflected out of the coupler is determined by the distance $l$ and may be varied by moving the second fiber with respect to the first. The material between the ends of the fibers has a refractive index substantially identical to the refractive index of the fiber cores to provide for greater efficiency. A second reflective surface means facing the end of the second fiber may be utilized to reflect and focus optical energy entering the coupler, into the end of the second fiber. The reflective surfaces may be planar, parabolic, spherical, ellipsoidal or any other appropriate shape.

6 Claims, 9 Drawing Figures

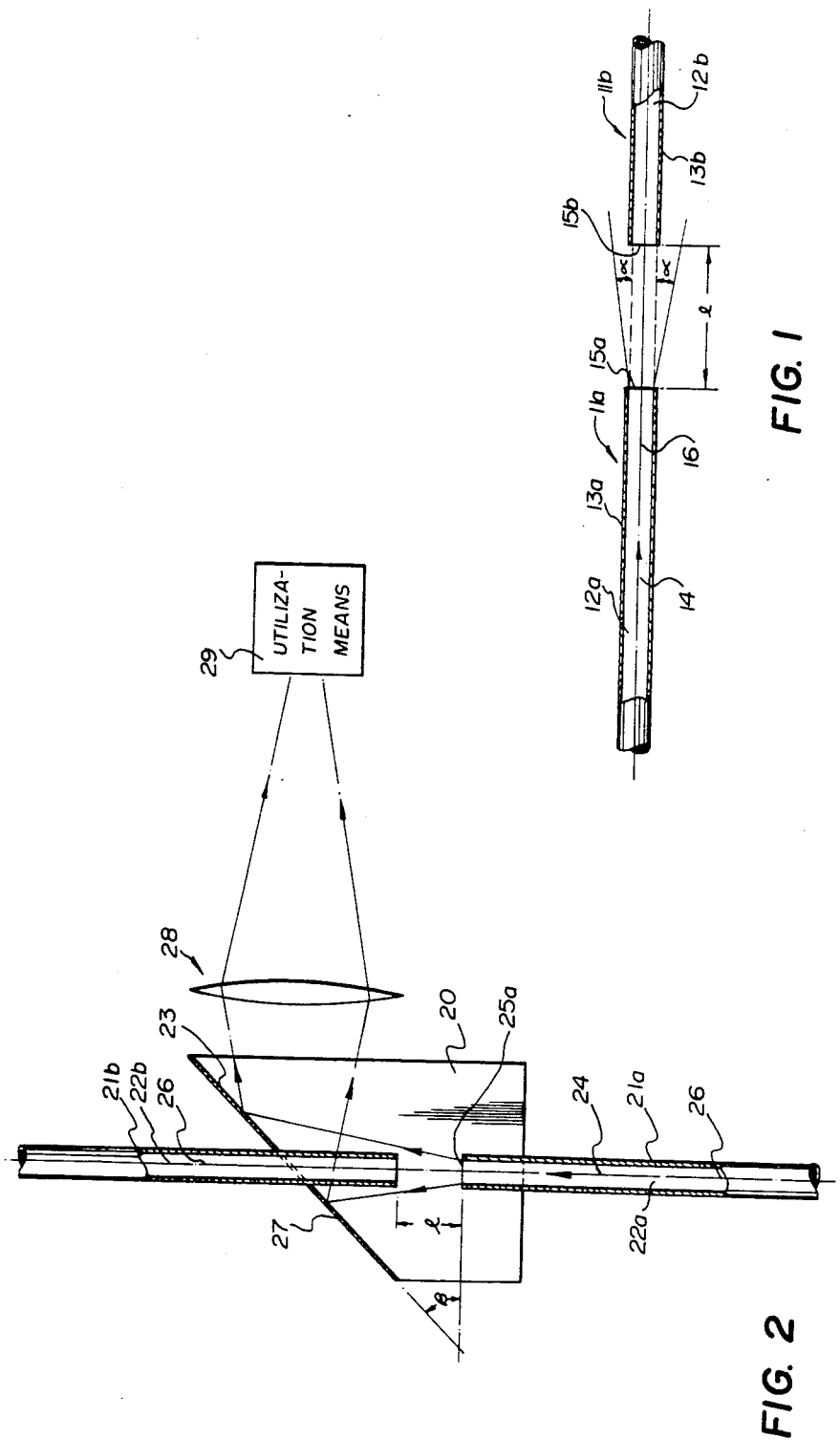

OPTICAL COUPLERS FOR FIBER OPTIC COMMUNICATION LINKS

This invention is directed to fiber optics components and in particular to optical tap and tee couplers for use with single multi-mode fibers.

With the advent of the development of low cost low loss fibers, the possible use of fiber optics in nonillumination-type applications, such as communication links, has been greatly enhanced. For such applications however, there is a need for tap couplers to tap off a portion of the optical energy in an optical fiber transmission line as well as tee couplers for coupling optical energy out of and into the data transmission line. The publication entitled "The Star Coupler: A Unique Interconnection Component for Multimode Optical Waveguide Communications Systems" by M. C. Hudson and F. L. Thiel — Applied Optics, Vol. 13, No. 11, Nov. 1974, pages 2540 to 2545 describes and compares two coupler systems: The Star coupler system and the Tee coupler system.

It is therefore an object of this invention to provide an optical coupler for coupling out a portion of the optical energy propagating along an optical fiber transmission line.

It is a further object of this invention to provide an optical coupler for coupling optical energy out of a fiber and for launching optical energy from a source into the fiber.

It is another object of this invention to provide a coupler having low insertion losses.

It is a further object of this invention to provide a coupler in which the amount of light coupled out of a fiber may be varied.

These and other objects are achieved in a coupler which includes a first length of optical fiber having a first end to be serially connected into the transmission line and a second end, a second length of optical fiber having a first end to be serially connected into the transmission line and a second end, the second ends of the fibers being positioned substantially along a common axis so as to face one another at a distance $l$, where $l \geq 0$. This allows a portion of the optical energy leaving the first fiber to enter the second fiber. The coupler further includes a reflective surface facing the first fiber to reflect the remaining portion of the optical energy out of the coupler. The percentage of the energy reflected out of the coupler is controlled by the distance $l$. The material between the ends of the fibers has a refractive index substantially identical to the refractive index of the fiber cores to provide for greater efficiency and may be a continuation of the fiber core without its sheathing. A second reflective surface means facing the end of the second fiber may be utilized to reflect and focus optical energy entering the coupler into the end of the second fiber. The reflective surfaces may be planar, parabolic, spherical, ellipsoidal or any other appropriate shape and may be formed on the outside surface of an optically transparent block or the inside surface of a chamber filled with liquid having a refractive index substantially similar to the index of the fiber cores.

In the drawings:

FIG. 1 illustrates the basic principles of a coupler in accordance with the present invention, FIG. 2 illustrates a fixed optical coupler;

Figure 4:
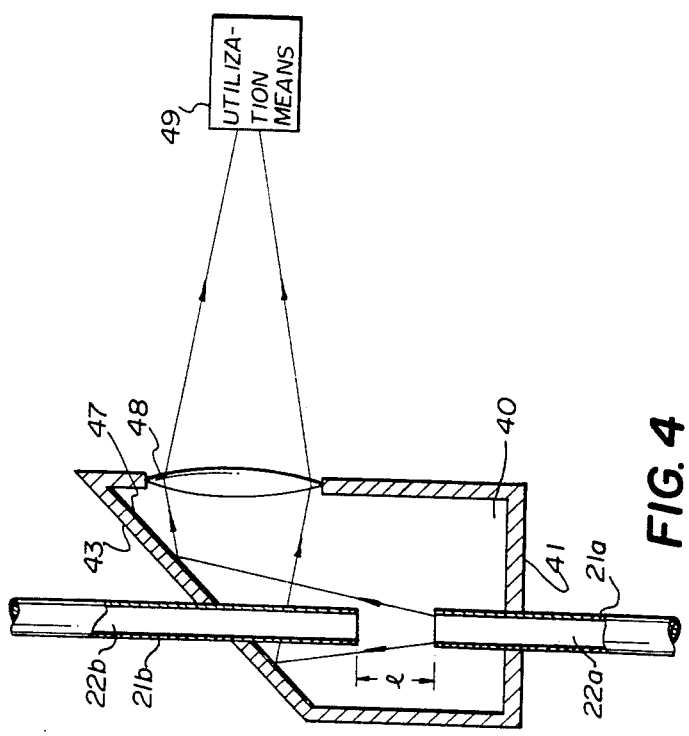
FIG. 4 illustrates a second embodiment of a varible optical coupler.

The principles of the present invention will be described with respect to FIG. 1. Optical fibers such as fibers 11a and 11b consist of a core 12a, 12b which is made of a transparent material having a high refractive index $n_c$ and a sheet 13a, 13b which is made of a material having a low refractive index $n_s$ and which covers the core. These fibers can propagate optical energy in a number of modes with very low attenuation losses and thus optical energy propagated in the direction as shown by arrow 14 in FIG. 1, will exit from the fiber at its end 15a. If the fiber end 15a has a smooth end surface which is perpendicular to the core axis 16, the optical energy will exit uniformly about the axis 16 at a spread angle $\alpha$. The angle $\alpha$ however is directly related to the numerical aperture NA of a particular fiber which is defined as:

$$NA = \sqrt{n_c^2 - n_s^2}$$

and therefore is fixed for a particular fiber. When a second fiber 11b having a smooth end surface 15b is placed in the path of the optical energy radiated from the first fiber 11a, at a distance $l$ from fiber 11a a portion of the optical energy will strike the fiber 11b and will be launched into fiber 11b. The remaining portion of the optical energy may be collected and focussed onto a detector or a third fiber into which it will be launched. Thus, if fibers 11a or 11b are coupled into an optical line, a portion of the optical energy propagated along the line may be coupled out at that point. Several such couplers may be connected into a line to couple out energy at predetermined intervals. In addition, the amount of optical energy coupled from the transmission line may be varied by varying the distance $l$ between the fibers 11a and 11b, i.e., when $l=0$, substantially no energy will be coupled out and as $l$ is increased, the percentage of energy coupled out of the line increases. Finally, if a material such as a liquid having a refractive index substantially similar to the refractive index $n_c$ of the fiber cores 12a and 12b is maintained between the end surfaces 15a and 15b of fibers 11a and 11b, the portion of the optical energy which impinges on the end surface 15b, will be launched into fiber 11b with low loss.

Various specific embodiments of optical tap couplers and optical tee couplers in accordance with this invention will now be described.

The optical tee coupler illustrated in FIG. 2 consists of an optically transparent block 20 with one end of each of two lengths 21a and 21b of optical fiber mounted within the block preferably along a common axis 26. The other ends of fibers 21a and 21b are used to connect the coupler into the transmission line. For maximum efficiency, the space between the fibers 21a and 21b in block 20 should have refractive index $n_b$ substantially identical to the refractive index $n_c$ of the fiber cores 22a and 22b. With optical energy propagating along fiber 21a in the direction of arrow 24, the energy will exit at the end 25a of fiber 21a and will spread at an angle α. Thus, a predetermined portion of the energy will be efficiently launched into fiber 21b due to the matching refractive indices $n_b$ and $n_c$, this portion being dependent on the distance $l$.

In addition, block 20 has a surface 23 in a plane which intersects the plane of the end surface 25a at an angle β, β being preferably in the order of 45°. Surface 23 further includes a reflective coating 27 and therefore the energy which is not launched into fiber 22b, will strike the reflective surface 23 and will be reflected out of block 20 perpendicular to axis 26. The coupler further includes a lens 28 mounted in the beam path to focus the beam into a utilization means 29 such as a detector or a third optical fiber.

Fibers 21a and 21b may be positioned within block 20 by fixing the fibers within two aligned holes in block 20 such that separation distances $l$ between the fibers is fixed, the distance $l$ being short for coupling out a low percentage of the optical energy and long for coupling out a large percentage of the optical energy. However, the alignment of the two fibers is not too critical as long as fiber 21b is positioned to be within the spreading beam from fiber 21a. In this embodiment, block 20 is preferably made from a material having a refractive index $n_b$ substantially identical to the refractive index $n_c$ of the fiber cores 22a and 22b.

Figure 3:
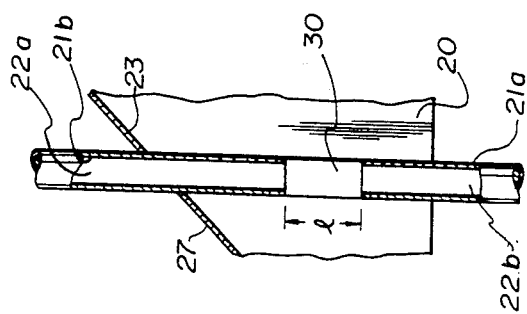
FIG. 3 illustrates a variable optical coupler.

In a further embodiment as shown in FIG. 3, fibers 21a and 21b may be located within a hole traversing the entire block 20. Fiber 21a is fixed a predetermined distance within block 20 while fiber 21b may be mounted within the block such that it can slide within the hole to vary the amount of optical energy coupled out by varying the distance $l$. The space 30 between the ends of fibers 21a and 21b is filled with a liquid having a refractive index $n_m$ which is substantially identical to the refractive indices $n_c$ of cores 22a and 22b. In addition, the refractive index $n_b$ of block 20 is also preferably similar to the refractive indices of the cores 22a and 22b.

Figure 5:
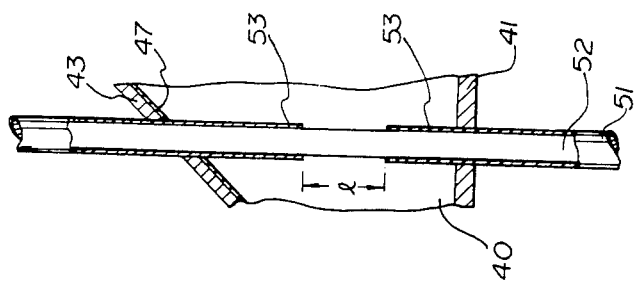
FIG. 5 illustrates a second embodiment of a fixed optical coupler.

In a further embodiment as shown in FIG. 4, the block 20 is replaced by a hollow closed chamber 40. The end 25 of the fiber 21a is mounted through one end wall 41 of the chamber 40 facing the other end wall 43 whose surface is not parallel to the end wall 41. Fiber 21b is mounted through wall 43 such that the distance $l$ may be varied. The inside surface of wall 43 is covered with a reflective coating 47 to reflect the optical energy impinging upon it from fiber 21a. The reflected energy is focussed by a lens 48 mounted in one of the side walls and directed to a utilization means 49 such as a detector or a third fiber. For maximum efficiency, the entire chamber is filled with a liquid having a refractive index $n_m$ which is substantially identical to the refractive index of the fiber cores 22a and 22b. To provide a coupler in which a fixed percentage of the energy propagating along fiber bus is coupled out, the fiber within chamber 40 may take the form shown in FIG. 5 wherein the core 52 of the fiber 51 is continuous through the chamber 40, however the fiber 51 does not have a sheath 53 of lower refractive index material covering the core 52 for a predetermined distance $l$ along its length. This allows a predetermined percentage of the optical energy to be coupled out of the fiber 51 while maintaining the alignment of the fiber.

Figure 7:
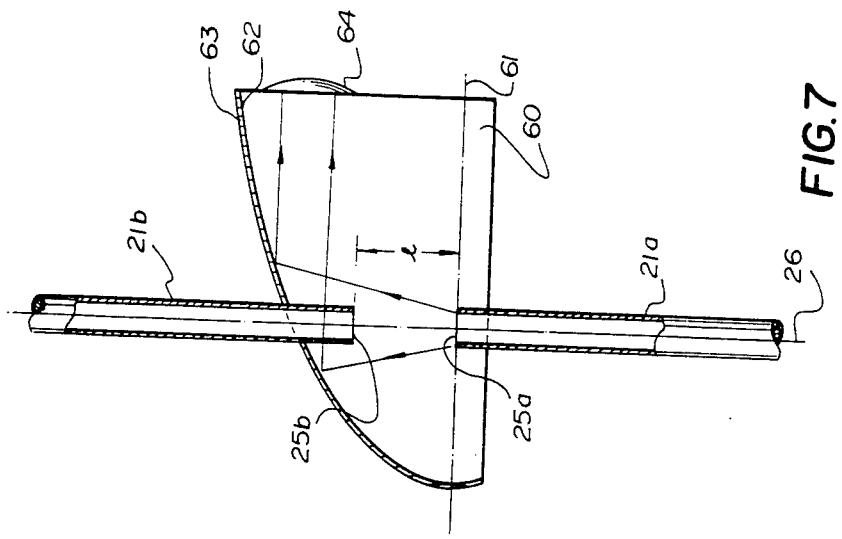
FIGS. 6 and 7 illustrate a front view and a cross-section view respectively of a coupler having a parabolic reflecting surface.
Figure 6:
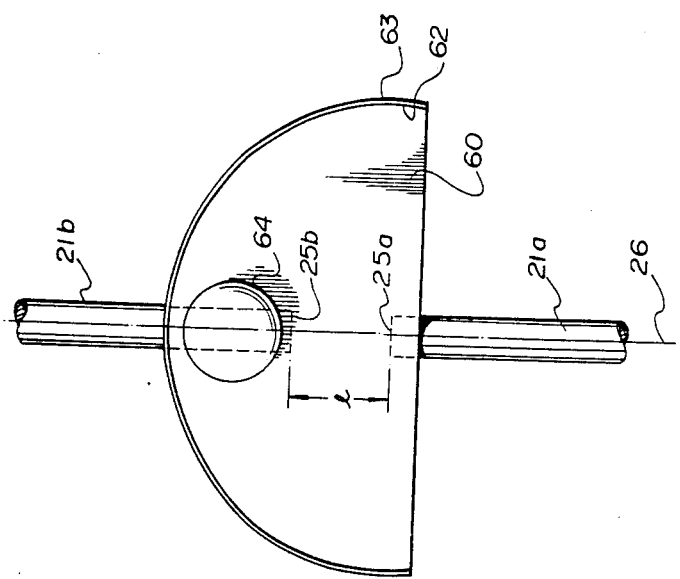

In the couplers described above, the reflective surface is planar, which allows for simplicity in its manufacture, however it may take various shapes. The reflective surface may be parabolic as illustrated in FIG. 6 which is a side view of the coupler and in FIG. 7 which is a cross-section view taken through the fiber axis 26. As in the previous figures, a fiber 21a is mounted within a block 60 or a chamber, in this particular instance however the fiber axis 26 should intersect the paraboloid axis 61 at the paraboloid focus and the end 25a of the fiber 21a is located at this focus. A fiber 21b is also mounted within the block 60 such that its end 25b is a fixed or a variable distance $l$ from the end 25a of fiber 21a. Most of the optical energy propagated along fiber 21a will be launched into fiber 21b, however due to the spread, a portion will strike the parabolic surface 62 which is covered by a reflective coating 63. Due to the parabolic shape of surface 62, the reflected energy will form a beam of optical energy having a constant cross-section which is parallel to the paraboloid axis 61. A lens 64 located on the beam path and mounted on block 60 will focus the beam onto a detector or a third fiber.

Figure 8:
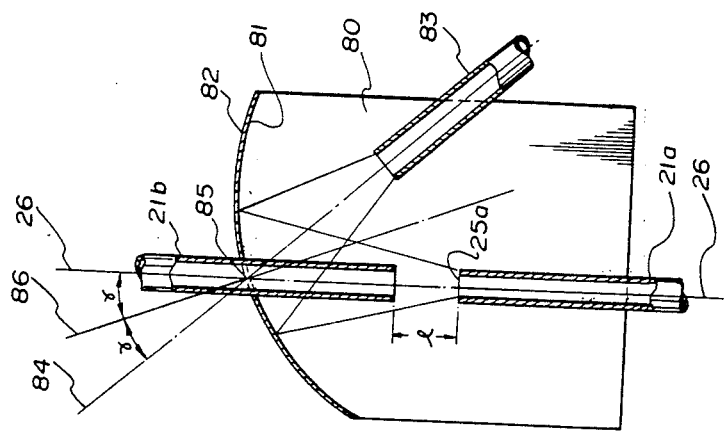
FIG. 8 illustrates an optical coupler having a spherical reflecting surface.

The reflective surface in the coupler may also be spherical in shape as illustrated in FIG. 8. This embodiment is particularly useful mainly because of ease of manufacture of the reflecting surface 81 which focusses the energy being coupled out of the main line into a third fiber or onto a detector mounted at the energy focus point of the surface. Fibers 21a and 21b are mounted within a block 80 along the fiber axis 26 with the end 25a of fiber 21a facing a spherical surface 81. The spherical surface being covered with a reflective coating 82. A third fiber 83 is also mounted within the block 80 along fiber axis 84. Fiber axis 84 passes through the point of intersection 85 of the fiber axis 26 and the surface 81 and is in the plane formed by the fiber axis 26 and the diametric axis 85 passing the point of intersection 85. In addition, fiber axis 85 is at an angle which is substantially equal to the angle between the fiber axis 26 and the diametric axis 86. This allows fiber 21b to move, in and out of block 80, varying the distance $l$ while at the same time, the optical energy which is not launched into fiber 21b is focussed into fixed fiber 83. Since the entire operation occurs in material having a refractive index substantially identical to the refractive index of the fiber cores, very little reflective loss occurs.

The reflective surface of the coupler may take other shapes which would be more difficult to manufacture, however which would provide certain advantages for specific applications. For instance, the reflective surface 81 shown in FIG. 8 may have an ellipsoidal shape and thus with the end 25a of fiber 21a located at one focus of the ellipsoid, the optical energy would be focussed at the second focus point where a third fiber or a detector could be positioned.

Though all of the above couplers have been described showing optical energy as being coupled out of an optical fiber line, they may also be utilized for launching optical energy into a fiber line. For example, in FIG. 8, optical energy propagating in fiber 83 will enter block 80, and will be reflected and focussed by surface 81 such that it will be launched into fiber 21a.

Figure 9:
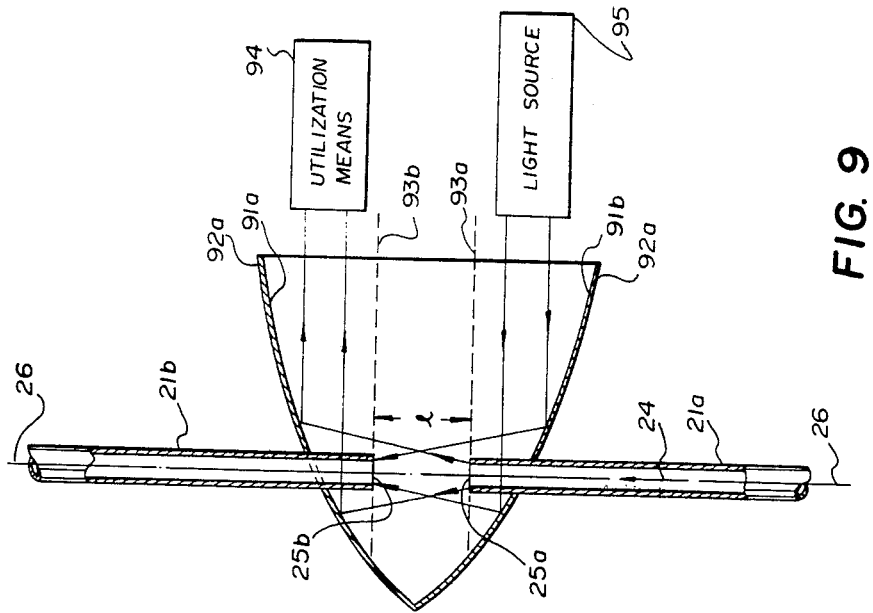
FIG. 9 illustrates an optical coupler for coupling energy into and out of an optical transmission line.

For certain applications, it is desirable to couple optical energy into a main bus as well as out. This is accomplished in a tee coupler in accordance with this invention of the type shown in FIG. 9. The tee coupler includes a block 90 into which the first and second fibers 21a and 21b are mounted along a fiber axis 26. The ends 25a and 25b of fibers 21a and 21b respectively being spaced a predetermined distance $l$. In addition end 25a faces a first shaped surface 91a of block 90 which is covered with a reflective coating 92a and end 25b faces a second similarly shaped surface 91b of block 90 which is also covered with a similar reflective coating 92b. The surfaces 91a and 91b in FIG. 9 are shown as being parabolic in shape, however these surfaces may take any appropriate shape. In addition, the fibers 21a and 21b are mounted within block 90 with their ends 25a and 25b located at the paraboloid foci on the paraboloid axes 93a and 93b of shaped surfaces 91a and 91b respectively.

In operation, optical energy propagating along fiber 21a as shown by arrow 24 will enter block 90 and spread. A portion of the energy will be launched into fiber 21b, while the remaining portion will be formed by surface 91a into a constant cross-section beam which is directed out of the coupler into a utilization means 93. At the same time, a beam of optical energy having a constant cross-section generated by a controlled light source 94 is directed into block 90 where it is focussed by reflective surface 91b onto fiber end 25b and launched into fiber 21b. Thus data may both be coupled out of and simultaneously coupled into an optical fiber transmission line.

We claim:

1. A fiber optic coupler for an optical transmission line comprising:

a first length of multi-mode optical fiber having a first end for serially connecting into the optical line and a second end, and a second length of multi-mode optical fiber having a first end for serially connecting into the optical line and a second end, the second end of the second fiber being moveably mounted with respect to the second end of the first fiber substantially along a common axis so as to face one another at a variable distance $l$, where $l \geq 0$, such that the portion of the optical energy leaving the second end of the first fiber which is launched into the second end of the second fiber is a function of the variable distance $l$; and reflective surface means mounted about the second fiber and facing the second end of the first fiber for reflecting the remaining portion of the optical energy leaving the second end of the first fiber out of the coupler.

2. A fiber optic coupler as claimed in claim 1 wherein said reflective surface means is shaped to focus the remaining portion of the optical energy.

3. A fiber optic coupler as claimed in claim 1 which further includes a block of optically transparent material having a refractive index substantially similar to the first and second fiber cores, the second end of the first fiber being fixed within said block and the second end of said second fiber being mounted within an opening in said block so as to be moveable in the direction of the common axis, and the reflective surface means being an optically reflective coating on one surface of said block.

4. A fiber optic coupler as claimed in claim 3 wherein said reflective surface is planar and said coupler includes means for focussing the reflected optical energy.

5. A fiber optic coupler for an optical transmission line comprising:

a first length of multi-mode optical fiber having a first end for serially connecting into the optical line and a second end, and a second length of multi-mode optical fiber having a first end for serially connecting into the optical line and a second end;

a chamber containing a liquid having a refractive index substantially similar to the first and second fiber cores, the second end of the first fiber being fixed within said chamber and the second end of the second fiber being moveably mounted with respect to the second end of the said first fiber within said chamber substantially along a common axis so as to face one another at a variable distance $l$, where $l \geq 0$, such that a variable portion of the optical energy leaving the second end of the first fiber will be launched into the second end of the second fiber, said chamber having an optically transparent opening and an inner optically reflective surface facing the second end of the first fiber for reflecting the remaining portion of the optical energy leaving the second end of the first fiber, out of the coupler through the optically transparent opening in the chamber.

6. A fiber optic coupler as claimed in claim 5 wherein said reflective surface is planar and said optically transparent opening includes a lens for focussing the reflected optical energy.

* * * * *